Dec. 1, 1936.　　　　A. F. CASE　　　　2,062,503
HOOD FOR CAR DUMPERS
Filed April 26, 1934　　　3 Sheets-Sheet 1

INVENTOR
ARTHUR F. CASE
Kuis Hudson Kent
ATTORNEYS

Dec. 1, 1936.   A. F. CASE   2,062,503
HOOD FOR CAR DUMPERS
Filed April 26, 1934   3 Sheets-Sheet 2

INVENTOR
ARTHUR F. CASE
Kwis Hudson & Kent
ATTORNEYS

Dec. 1, 1936.  A. F. CASE  2,062,503
HOOD FOR CAR DUMPERS
Filed April 26, 1934  3 Sheets-Sheet 3

INVENTOR
ARTHUR F. CASE
ATTORNEYS

Patented Dec. 1, 1936

2,062,503

UNITED STATES PATENT OFFICE 2,062,503

HOOD FOR CAR DUMPERS

Arthur F. Case, Cleveland, Ohio, assignor to The Wellman Engineering Company, Cleveland, Ohio, a corporation of Ohio Application April 26, 1934, Serial No. 722,477

37 Claims. (Cl. 214—123)

This invention relates to car dumpers of the type having a car receiving cradle which is turned to dump a car supported by the cradle, and more particularly to retarder or hood means for a car dumper to retard and control the shifting of the material in the car and the discharge of the same therefrom when the cradle is turned.

As the tilting or dumping movement of the cradle of a car dumper commences the material in the car being dumped starts to shift toward the dumping side. This shifting movement of the material toward the dumping side of the car before the car reaches full dumping position is disadvantageous in any type of dumper.

Furthermore, the tilting or dumping movement of the cradle of a car dumper, particularly when there has been a shifting of the material in the car being dumped, during the early stages of the movement acts to throw the material at the far side and bottom of the car outwardly into the discharge pan at a distance from the dumping tower or frame. This results in considerable breakage of the material being dumped, unless the outflow of the material from the car is retarded. This breakage is serious, irrespective of the particular material being dumped, but it is more serious when the material is coal.

Another cause of breakage of the material is the fact that the dumping movement of the cradle causes the contents of the car, especially if it has shifted previously, to be discharged suddenly therefrom in a large volume, resulting in the material sliding down the discharge pan in a great mass and at a substantial speed.

The principal object of the present invention is to provide improved means in a car dumper for substantially reducing the amount of breakage in the material caused by the dumping movement of the cradle.

Another object of the invention is to provide means in a car dumper for substantially eliminating or reducing the shifting movement of the material in the car being dumped toward the dumping side of the car during the early stages of the turning movement of the cradle.

A still further object is to provide means in a car dumper which prevents the discharge of any of the material from the car until the cradle has moved in its turning movement through a substantial arc and which then automatically allows a retarded and controlled discharge of the material from the car.

Since it is customary in positioning a car upon the cradle of a car dumper to have a man ride the car onto the cradle and to manually set the car brakes at the proper time, it is necessary that the means specified above be of such character as not to interfere with the car rider or to present a dangerous hazard for the rider when the cradle is in car receiving position.

Another important object of the invention is to provide improved means in a car dumper, such as specified in the above enumerated objects, and which is of such character as not to be unsafe when the cradle of the dumper is in car receiving position, in that said means will be automatically positioned, so as to provide the clearance necessary to allow a car with a rider thereon to move safely onto the cradle.

Another object is to provide means in a car dumper, such as specified above, that is capable of functioning with cars of different height and length.

Another object is to provide in a car dumper, means, such as previously specified, which will not interfere with the operation or effectiveness of the car clamps.

Additional and further objects and advantages will become apparent during the detailed description of an embodiment of the invention now about to be described and which, for purposes of illustration, is shown as applied to a car dumper of the lifting and tilting type; although, of course, it could be applied to a car dumper of the turn-over type, in which the cradle of the car dumper revolves about a fixed pivot and has no vertical hoisting movement previous to its dumping rotation; or to a car dumper of the rolling type, in which the car is clamped in a barrel-shaped cradle that is rolled up an inclined track to a point where the contents of the car are to be dumped; or to a car dumper of any other type.

Referring to the accompanying drawings illustrating such embodiment.

Referring to the accompanying drawings, a car dumper is shown as comprising a tower 15 formed of suitable structural members and having a vertically movable, tiltable cradle 16 arranged therein and slidable along suitable vertical guides, the vertical movement of the cradle in the tower being effected by cables or ropes connected to the cradle and to suitable drums and passing around sheaves located at the top of the tower as is well understood in the art. The cradle 16 is provided with a platen 17 having tracks thereon to receive a car 18, such platen preferably being shiftable laterally by suitable means to cause the car to be moved over beneath the car clamps on the dumping side and to engage the bumper at such side as the cradle starts to turn and to restore the platen to center position at the end of the return movement of the cradle after the dumping operation.

The cradle 16 is arranged to be first hoisted vertically to the desired dumping point and then to be rotated upon a horizontal axis extending longitudinally of the cradle so that the material in the car on the cradle will be discharged from the car over the side or dumping edge thereof. The point where the vertical hoisting of the cradle terminates and its dumping rotation commences is ordinarily adjustable to suit different conditions, while the rotation of the cradle is accomplished by the engagement of pivot pins carried by the cradle with suitable hooks arranged on a vertically adjustable girder movably supported and guided by the framework of the tower. The means for tilting the cradle and the adjustable means referred to have not been illustrated herein, since per se they form no part of the present invention and are well understood in the art, it being deemed sufficient to show the car and cradle in the tilted dumping position by means of dot and dash lines, (see Fig. 1).

Figures 1, 4, 5, 5A, 6:
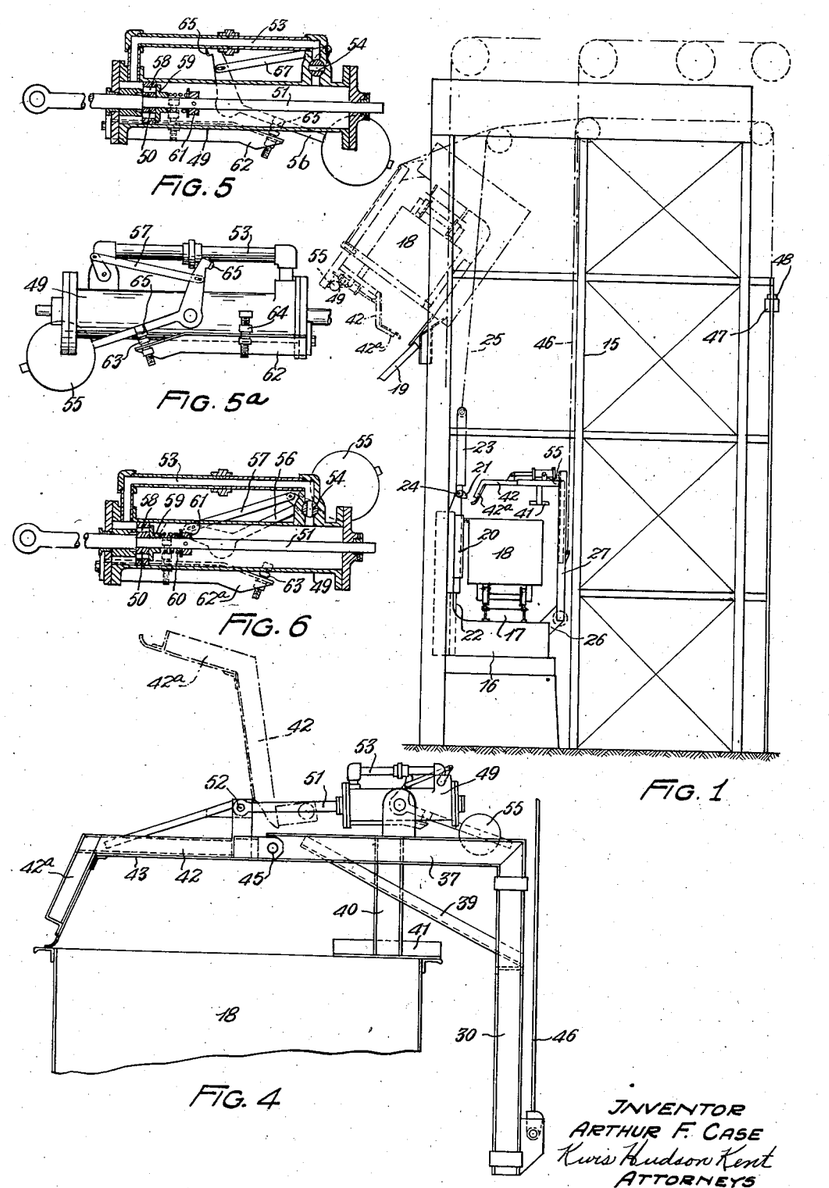
Figure 1 is a side elevational view of a car dumper of the lifting and tilting type, the cradle being shown in car receiving position in full lines and in its raised and fully tilted position in dash and dot lines, certain of the parts of the dumper being shown diagrammatically since they form, per se, no part of the present invention and are well understood in the art.
Fig. 4 is a fragmentary side elevational view of the cradle and particularly of the hood mechanism thereof, the hood being shown in full lines in car covering position and in dash and dot lines in the raised position.
Figs. 5 and 6 are detail sectional views of the dash-pots which control the pivotal movement of the hoods.
Fig. 5a is an elevational view of the dash-pot in reversed position to the showings of Figs. 5, and 6, and Figs. 7 to 10, inclusive, are detailed and somewhat diagrammatic views of the cradle in the different positions it assumes during its turning or tilting movement.

A portion of a discharge pan or bin 19 is illustrated in Fig. 1 and it is onto such pan or bin that the contents of the car are dumped by the dumping movement of the cradle. The inner end of the pan is ordinarily hingedly connected to the adjustable girder referred to above and is of such width at its inner end as to be capable of receiving material from the longest car which can be handled by the dumper, while the outer end of the pan is ordinarily supported by ropes connected to such end and passing over the top of the main framework of the tower.

Referring again to the cradle 16, it will be seen that certain of the vertically extending arms of the cradle at the dumping side thereof have secured thereto bumper members 20 in which clamp hooks 21 are slidably mounted and which have downwardly extending portions 22 adapted to engage the base of the dumper when the cradle is in its lowered position to cause the clamp hooks to move upwardly away from the top edge of the car after the latter has been dumped and the cradle has returned to car receiving position. Car clamp beams 23 are pivotally connected at 24 to the clamp hooks 21 by means of connecting straps secured to the webs of the beams and forming yokes straddling the hooks 21. The clamp beams 23 are of such length as to extend transversely across the cradle and are held in elevated position when the cradle is lowered by means of cables or ropes 25 connected to the members 20 and passing through suitable sheaves or other means on the clamp beams and over sheaves located at the top of the tower to counterweights (not shown) movable vertically of the tower in suitable guides. This arrangement of the car clamps is well understood in the art, as is also the manner in which the clamps function when the cradle is raised and tilted; that is when the cradle moves vertically upwardly the hooks 21 stand stationary until engaged by the top edge of the car at the dumping side thereof, after which the hooks travel with the car and the clamp beams swing downwardly across the top of the car until the tilting or dumping movement of the cradle causes the counterweights connected to the cables 25 to bring the clamp beams firmly against the top of the car and hold the same in such position against the weight of the car and its contents during the dumping operation to thereby maintain the car in position upon the tracks of the cradle. It will be understood that there may be any number of these car clamps as desired, although in the present embodiment four such clamps have been illustrated. It will further be understood that the means for raising the hooks 21 out of engagement with the top of the car when the cradle is in its car receiving position may take various forms and that the specific construction disclosed herein for that purpose is merely illustrative.

At the side of the cradle opposite to the dumping side thereof the cradle platform has secured thereto a longitudinally extending girder frame 26 formed of suitable structural members. Extending upwardly from the girder frame 26 are standards or guide columns 27, there being four of these standards or columns shown in the present embodiment (see Fig. 2) and each being formed of oppositely facing channels 28 interconnected by a plate 29 on the inward or cradle sides of the standards or columns. It will be understood that the standards 27 are suitably connected at their lower ends to the girder frame 26 by means of angles, gussets and like structural members commonly used for such purposes.

A plurality of separate movable frames operate between the standards or guide columns 27, there being in the present embodiment three of these movable frames. The intermediate or wide frame operates between the two inner columns and the end or narrow frames between the end columns and the intermediate columns.

Each frame comprises spaced vertically extending members 30 connected at their lower ends to a longitudinally extending structural member 31 by means of suitable elements, such as gusset plates and the like. The two end members 30 of each frame lie adjacent to the columns or standards 27 and are slidably connected therewith by means of guide brackets or shoes 32. The members 30 of each frame are interconnected intermediate their upper and lower ends by longitudinally extending members 33, as clearly shown in Fig. 2. The upper ends of the members 30 are interconnected in pairs by structural members 34 so that each frame is provided with one or more spaces 35 adjacent its upper end to accommodate the car clamps during the dumping operation, it being noted that the two end frames are each provided with one space 35, while the intermediate frame is provided with two spaces 35. The members 30, 31, 33 and 34 of the frames are interconnected by suitable cross-members or tie rods and the like, indicated generally by the numeral 36, as is well understood in the art.

The upper ends of the frames are provided with cantilever extensions projecting transversely of the cradle toward the dumping side and extending slightly less than half way across the car. These cantilever extensions are formed of structural members 37 having their rear ends rigidly connected to the movable frames and being interbraced by members 38 extending between adjacent members 37 and by diagonal braces 39 extending beneath the members 37 from the latter to the vertical members 30 of the frame. Downwardly extending channels 40 are connected to the members 37 of the cantilever extensions of the frames and carry at their lower ends stop plates 41 (see Fig. 4) adapted to engage the top of the car at the side thereof opposite to its dumping side.

The members 37 of the cantilever extensions of the frame have pivotally connected to their front or free ends retarder or hood sections 42, preferably formed of steel plate 43 suitably stiffened and reenforced by angles, channels, and other structural members, indicated generally as 44.

If desirable, the under or inner side of the plate 43 of the retarder or hood sections may be lined with suitable rubber plating or other material to deaden the impact against the hood plate of the material being dumped. The outer or front ends, that is the left-hand ends of the hood sections, as viewed in Fig. 4, are provided with angularly disposed portions 42a extending downwardly substantially the same distance as the channels 40 and will engage the upper edge of the car adjacent the dumping side thereof. As disclosed in the present embodiment there are seven hood sections 42 disposed longitudinally of the car dumper, a broad hood section and a narrow hood section being carried by the two end frames and two narrow hood sections and a broad hood section being carried by the intermediate frame.

It will be noted that sufficient space is left between certain of the hood sections to accommodate the car clamps 23 during the dumping operation. The hood sections are hingedly connected to the ends of the members 37 of the cantilever extensions by suitable hinges, as indicated at 45. The sliding frames with their hood sections are suspended by ropes 46 passing upwardly of the dumper tower over suitable sheaves and connected to counterweights 47 moving in vertical guides at the rear of the dumper frame. Each of the movable hood frames is provided with two counterweights 47 and suspending cables 46, thus making in all in the present embodiment six operating counterweights for the three hood frames, which weights in aggregate closely approximate the weight of the movable frames and the hood sections. Stops 48 are provided on the counterweight guides to limit the upward travel of the counterweights, whereby as the cradle approaches car-receiving position the counterweights 47 will engage the stops 48 and further downward movement of the movable frames will cease, while the cradle continues downwardly thus causing a relative elevation of the frames and hood with respect to the cradle and car and providing ample clearance above the top of the car.

Figure 2:
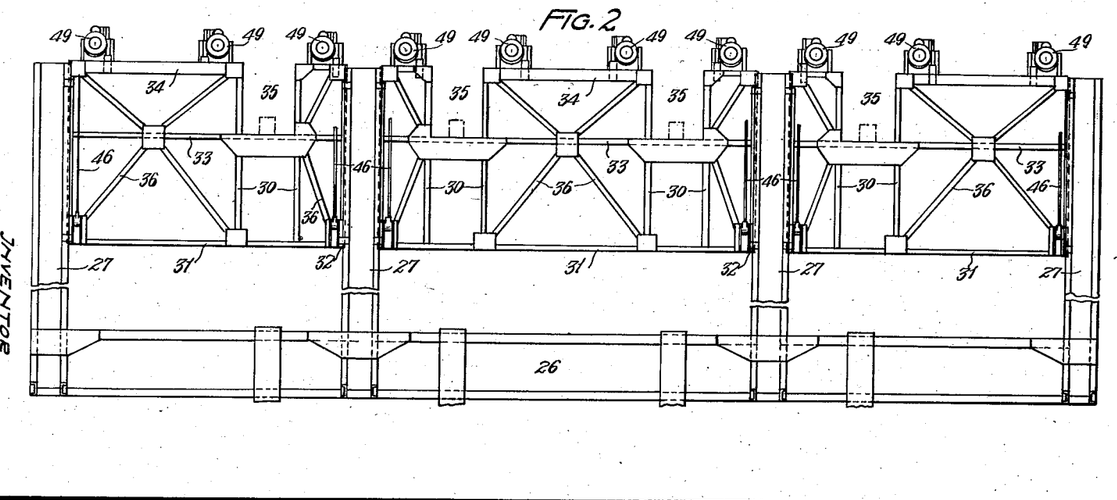
Fig. 2 is a rear elevational view of the cradle of the car dumper shown in Fig. 1.
Figure 3:
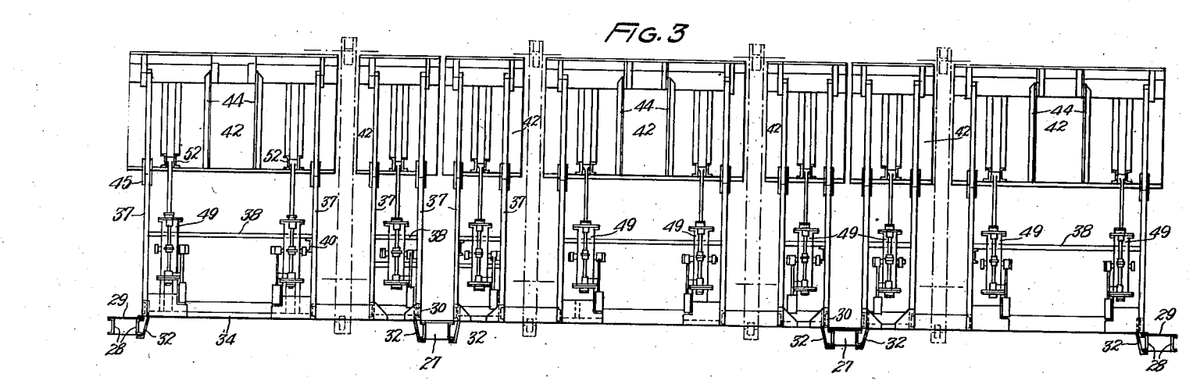
Fig. 3 is a top plan view of the cradle of the dumper with the hoods shown in the operative or car covering position, the car clamps of the cradle being shown in dash and dot lines.

As previously stated, there are seven retarder or hood sections connected by hinges to the three movable frames and it will be noted that such arrangement will not interfere with the car clamps or their operation. Referring to Figs. 2 and 3, it will be noted that three of the hood sections are connected to the middle movable frame and that the center hood section on this frame is of sufficient length to close the space between the inner car clamps of the cradle, the other two hood sections being at either side of the center section and extending approximately half the distance between the inner car clamps and the end car clamps. The end movable frames each carry two hood sections, one of which is a narrow section and is located toward the center of the dumper and extends approximately half the distance between the inner car clamp and the end car clamp, and the other of which is a wide hood section and is located outside of the end clamp.

It will be seen from the arrangement just discussed that the dumper may readily accommodate a car requiring four clamps or a shorter car which only requires three clamps. In the latter case the end hood section beyond the end of the car simply descends to its lowest position along with the idle car clamp. The space between the hood sections is sufficient to allow the car clamps to operate normally without any interference of the hood and when the clamps are in position on top of the car during the dumping operation they, together with their holding ropes or cables, are in position to prevent the movable frames from moving.

As previously stated, hood sections 42 are hingedly connected to the cantilever extensions of the movable frames and the swinging movement of the hood sections is controlled by independent dash-pots located on the cantilever extensions of the movable frames. These dash-pots comprise cylinders 49 filled with a suitable liquid not ordinarily affected by changes in temperature and fitted with pistons 50 mounted on through rods 51 connected at 52 to the hinged hood sections. The cylinders are also provided with by-passes formed of the pipes 53 controlled by valves 54 which when open allow the liquid to move freely from ahead of the pistons through the by-passes and into the cylinders behind the pistons. When the valves are closed, however, the pistons cannot move since they are locked in place by the liquid.

The valves 54 are closed when the cradle is in the upright position and are operated during the turning movement of the cradle by counterweights 55 carried by bellcrank levers 56 pivotally connected at the junctions of their arms to the cylinders 49. The shorter arms of the bell cranks 56 are provided intermediate their ends with pins which extend into slots formed in the links 57 whereby the counterweights and bellcranks are operatively connected to the valves 54 by a lost-motion connection.

When the cradle has turned in its dumping operation through an angle between 90° and 100° the counterweights 55 swing by gravity to a position such as to open the valves 54 whereupon, as will later be explained, the pressure of the coal against the hinged hood sections tends to swing said sections open and to move the pistons inwardly in the cylinders, that is, toward the right as viewed in Figs. 5 and 6; the speed with which this movement takes place being controlled by the degree of opening in the valves 54 which preferably is adjustable.

In this way the flow of coal under the hinged hood and into the pan is under automatic control due to the retarded opening movement of the hood sections. After the material is discharged from the car and while the cradle is returning to its original upright position the hinged hood sections will assume their initial relationship to the movable frames and the counterweights 55 will swing to a position such as to close the valves 54.

The regulation of the degree of opening of the valves 54 is obtained as follows. Angle brackets 62 are secured to the cylinders 49 with one of the arms of the brackets arranged substantially horizontally and with the rear ends of the brackets angularly offset downwardly as indicated at 62a. Adjustable stops 63 are carried by the substantially horizontal flanges of the portions 62a, while similar adjustable stops 64 are carried by said flanges on the opposite side of the pivots for the bellcranks 56.

The angular arms of the bellcranks 56 are provided with abutment lugs 65, the lugs 65 on the longer arms of the bellcranks engaging the stops 63 when the cradle is substantially vertical and the lugs on the shorter arms engaging the stops 64 when the cradle has been tilted to dumping position. It will be clear that the stops may be adjusted to vary the length of arc through which the counterweights 55 may travel and that the amount of opening movement imparted to the valves 54 is thus controlled.

During the return movement of the hood sections the pistons 50 move to the outer ends of the cylinders 49, that is, toward the left, as viewed in Figs. 5 and 6, this movement of the pistons 50 being permitted due to the pistons having check valves comprising passages 58 through the pistons, which are closed during movement of the pistons to the right-hand end of the cylinders, as viewed in the drawings, by slidable valve members 59 mounted on the rods 51 and held in engagement with the pistons 58 by springs 60 abutting the valve members 59 and abutment members 61 fixed to the rods 51.

The operation of the car dumper is as follows: When the cradle is in the car receiving position, as shown in full lines in Fig. 1, the movable frames and the hinged hoods are suspended at a point near the upper ends of the columns 27 since the frame counterweights 47 have engaged the stops 48 during the downward movement of the cradle just prior to the cradle reaching car receiving position. It will be noted that there is ample clearance for either a high or low car to run onto the cradle and that an operator may safely ride the car onto the cradle and set the brakes at the proper time.

After the loaded car is placed on the cradle, the cradle starts its upward movement. The movable frames and the hinged hoods remain stationary until the stops 41 engage the top of the car. As soon as this occurs the frames and hoods move upwardly with the car and cradle until the cradle engages the pivots and begins to turn to dump the car.

Figures 7, 8, 9, 10:
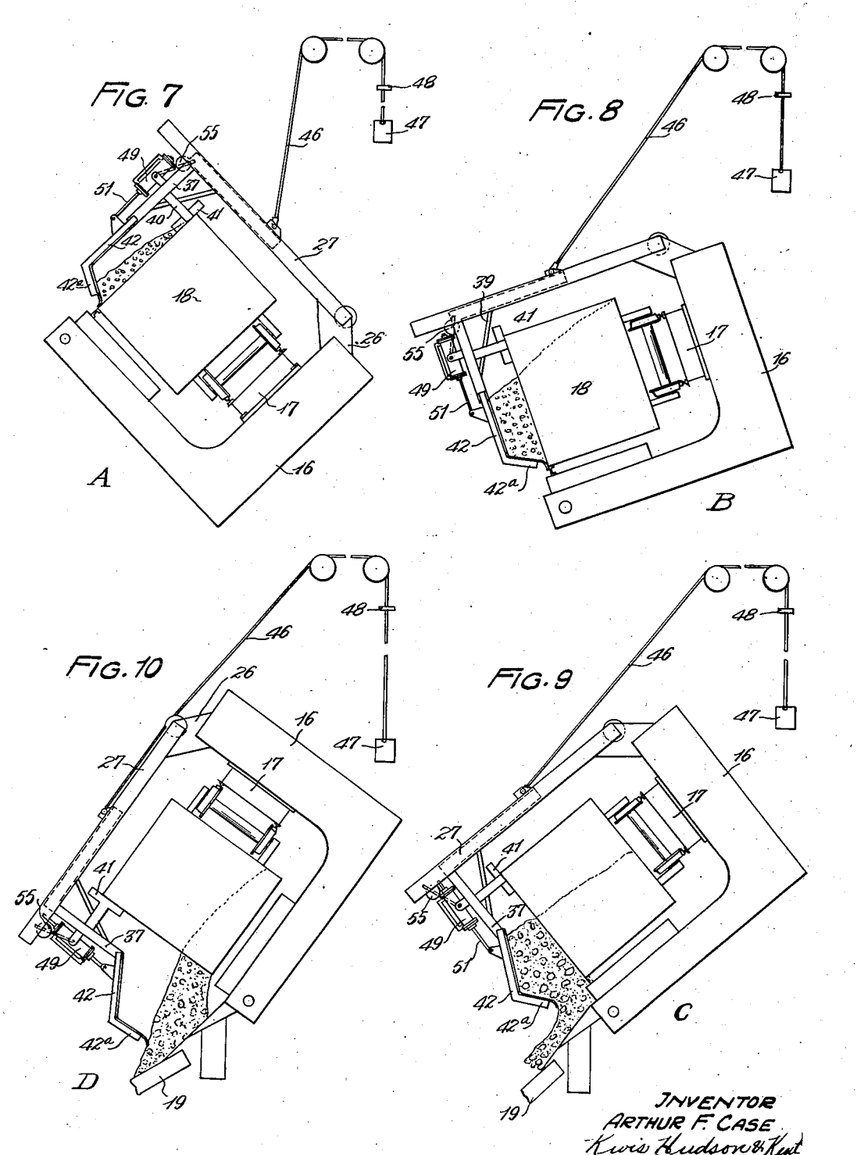

It will be noted that the hoods 42 and their depending portions 42a overlie the material in the car, and particularly that portion adjacent the dumping side. As the cradle turns the material is held by the hood from leaving the car, there being a slight shifting movement of the material toward the dumping side as indicated in Figs. 7 and 8 wherein the cradle is shown as having turned respectively through arcs of 45° and 90° approximately. The hoods 42 cannot swing open under the pressure of the material during the initial portion of the turning operation of the cradle since they are locked in place by the pistons 50 pressing against the liquid in the cylinders 49.

Just after the cradle has turned through an arc approximating 100°, the counterweights 55 start to swing by gravity in an anti-clockwise direction, as viewed in Figs. 7 to 10 inclusive, which movement of the counterweights 55 turns the valves 54 permitting the liquid in the cylinders 49 to by-pass to the opposite sides of the pistons 50. The hinged hoods then swing open under the weight of the material pressing thereagainst until they have reached their fully open position which is approximately after the cradle has turned through an arc of 145°.

The opening of the hinged hoods is a controlled retarded opening wherefore the material is allowed to leave the car in gradually increasing amounts until the cradle has been fully inverted. The speed of this opening movement of the cradle may be adjusted by the size of the valve openings and by stops engageable by the counterweights. It will be understood that as the cradle turns in its dumping operation the car clamps operate in the usual manner swinging across the car and being accommodated in the spaces 35 between the hood sections and the movable frames. The operation of the car clamps is entirely independent of the operation of the hoods.

After the contents of the car have been dumped the cradle returns to a vertical position during which time the counterweights 55 swing in a clockwise direction to close the valves 54.

When the cradle has reached a position, in its return to the upright or vertical position, where gravity tends to move the hoods 42 downwardly across the car, the hoods will effect such movement and return to the substantially horizontal position shown in Fig. 1, it being understood that the pistons 50 permit this movement of the hoods since the liquid passes through the valve passages 58 in the pistons when the latter move toward the left (as viewed in the drawings) of the cylinders, it being remembered that the check valve 59 moves against the action of the springs 50 away from the pistons.

As previously stated, just prior to the cradle reaching car receiving position, the counterweights 47 engage the stops 48 and the further downward movement of the frames and hoods is arrested, although the cradle continues to move downwardly a short distance. This of course causes the frames and hoods to move upwardly relative to the cradle. The retarded controlled opening of the hoods during the dumping operation eliminates or minimizes the breakage of the material since the same is allowed to gradually flow from the car and because the shifting movement of the material during the early stages of the dumping operation is held to a minimum.

Since the frames are formed in separate sections and the hoods likewise are separate and spaced longitudinally of the cradle, it will be evident that cars of varying length can be easily accommodated by the dumper.

Although a preferred embodiment of the invention has been illustrated and described herein, it should be understood that the invention is not to be limited thereto, but is susceptible of various modifications and adaptations within the scope of the appended claims.

Having thus described my invention, I claim:

1. In a car dumper, a car receiving cradle adapted to be turned to dump a car thereon, a hinged hood operatively connected with said cradle extending transversely toward the dumping side thereof and adapted to overlie the material in the car, and means controlled by the dumping movement of the cradle for effecting a controlled positively retarded swinging movement of the hood during a portion of said dumping movement.

2. In a car dumper, a car receiving cradle adapted to be turned to dump a car thereon, a hinged hood carried by said cradle and extending transversely toward the dumping side thereof and adapted to overlie the material in the car, and means controlled by the dumping movement of the cradle for maintaining said hood against swinging movement relative to the cradle during the initial portion of the dumping movement and for effecting a controlled retarded relative swinging movement thereof during the latter portion of the dumping movement.

3. In a car dumper, a car receiving cradle adapted to be turned to dump a car thereon, a hinged hood operatively connected with said cradle extending transversely toward the dumping side thereof and adapted to overlie the material in the car, and fluid means for effecting a controlled retarded swinging movement of the hood during a portion of the dumping movement of the cradle.

4. In a car dumper, a car receiving cradle adapted to be turned to dump a car thereon, a hinged hood operatively connected with said cradle extending transversely toward the dumping side thereof and adapted to overlie the material in the car, and fluid means for maintaining said hood against swinging movement relative to the cradle during the initial portion of the dumping movement and for effecting a controlled retarded swinging movement thereof during the latter portion of the dumping movement.

5. In a car dumper, a car receiving cradle adapted to be turned to dump a car thereon, a hinged hood operatively connected with said cradle extending transversely toward the dumping side thereof and adapted to overlie the material in the car, and means for effecting a controlled retarded swinging movement of the hood during a portion of the dumping movement of the cradle, said means including a cylinder having a piston therein operatively connected with said hood.

6. In a car dumper, a car receiving cradle adapted to be turned to dump a car thereon, a hinged hood operatively connected with said cradle extending transversely toward the dumping side thereof and adapted to overlie the material in the car, and means for effecting a controlled retarded swinging movement of the hood during a portion of the dumping movement of the cradle, said means including a cylinder containing fluid, a piston in said cylinder and operatively connected with said hood, a by-pass for the fluid communicating with the opposite ends of said cylinder, and a control valve arranged in said by-pass.

7. In a car dumper, a car receiving cradle adapted to be turned to dump a car thereon, a hinged hood operatively connected with said cradle extending transversely toward the dumping side thereof and adapted to overlie the material in the car, and means for effecting a controlled retarded swinging movement of the hood during a portion of the dumping movement of the cradle, said means including a cylinder adapted to contain fluid, a piston in said cylinder operatively connected with said hood, a by-pass communicating with the opposite ends of said cylinder, a control valve for said by-pass, and a counterweight for operating said valve.

8. In a car dumper, a car receiving cradle adapted to be turned to dump a car thereon, a plurality of independent hinged hoods operatively connected with and spaced longitudinally of said cradle extending transversely toward the dumping side thereof and adapted to overlie the material in the car, and means for effecting a controlled retarded swinging movement of the hoods during a portion of the dumping movement of the cradle.

9. In a car dumper, a car receiving cradle adapted to be turned to dump a car thereon, a plurality of independent hinged hoods operatively connected with and spaced longitudinally of said cradle extending transversely toward the dumping side thereof and adapted to overlie the material in the car, and means for maintaining said hoods against swinging movement relative to the cradle during the initial portion of the dumping movement and for effecting a controlled retarded swinging movement thereof during the latter portion of the dumping movement.

10. In a car dumper, a car receiving cradle adapted to be turned to dumping position, a hinged hood associated with said cradle for bodily movement relative thereto and extending at all times substantially transversely thereof toward the dumping side, and means controlled by the dumping movement of the cradle for effecting a controlled retarded swinging movement of the hood during a portion of the dumping movement of the cradle.

11. In a car dumper, a car receiving cradle adapted to be turned to dumping position, a hinged hood carried by said cradle for bodily movement relative thereto and extending transversely thereof toward the dumping side, means controlled by the dumping movement of the cradle for effecting a controlled retarded swinging movement of the hood during a portion of the dumping movement of the cradle, and means for effecting a relative upward bodily movement of said hood as the cradle approaches car receiving position.

12. In a car dumper, a car receiving cradle adapted to be turned to car dumping position, a frame mounted on said cradle for vertical movement therewith and relative thereto, a hood hingedly connected to said frame and adapted to overlie a car on said cradle, and means controlled by the dumping movement of the cradle for effecting a controlled retarded swinging movement of said hood during a portion of the dumping movement of the cradle.

13. In a car dumper, a car receiving cradle adapted to be turned to car dumping position, a frame mounted on said cradle for vertical movement relative thereto, a hood hingedly connected to said frame and adapted to overlie a car on said cradle, means controlled by the dumping movement of the cradle for effecting a controlled retarded swinging movement of said hood during a portion of the dumping movement of the cradle, and means for effecting an upward movement of the frame relative to the cradle as the latter approaches car receiving position.

14. In a car dumper, a car receiving cradle adapted to be turned to dumping position, a hinged hood carried by said cradle for movement therewith and for bodily movement relative thereto and extending transversely thereof toward the dumping side, and means controlled by the movement of the cradle for maintaining said hood against swinging movement relative to the cradle during the initial portion of the dumping movement and for effecting a controlled retarded swinging movement thereof during the latter portion of the dumping movement.

15. In a car dumper, a car receiving cradle adapted to be turned to car dumping position, a frame mounted on said cradle for vertical movement therewith and relative thereto, a hood hingedly connected to said frame and adapted to overlie a car on said cradle, and means controlled by the dumping movement of the cradle for maintaining said hood against swinging movement relative to the cradle during the initial portion of the dumping movement and for effecting a controlled retarded swinging movement thereof during the latter portion of the dumping movement.

16. In a car dumper, a car receiving cradle adapted to be turned to dumping position, a hood hingedly associated with said cradle for bodily movement relative thereto and extending transversely thereof toward the dumping side, means controlled by the dumping movement of the cradle for maintaining said hood against swinging movement relative to the cradle during the initial portion of the dumping movement and for effecting a controlled retarded swinging movement thereof during the latter portion of the dumping movement, and means for effecting a relative upward bodily movement of said hood as the cradle approaches car receiving position.

17. In a car dumper, a car receiving cradle adapted to be turned to car dumping position, a frame mounted on said cradle for vertical movement relative thereto, a hood hingedly connected to said frame and adapted to overlie a car on said cradle, means controlled by the dumping movement of the cradle for maintaining said hood against swinging movement relative to the cradle during the initial portion of the dumping movement and for effecting a controlled retarded swinging movement thereof during the latter portion of the dumping movement, and means for effecting an upward movement of the frame relative to the cradle as the latter approaches car receiving position.

18. In a car dumper, a car receiving cradle adapted to be turned to car dumping position, a frame mounted on said cradle for vertical movement relative thereto and having at its upper end a cantilever extension projecting transversely of the cradle, a hood hingedly connected to the outer end of said extension and adapted to overlie a car on said cradle, and means for effecting a controlled retarded swinging movement of the hood during a portion of the dumping movement of the cradle.

19. In a car dumper, a car receiving cradle adapted to be turned to car dumping position, a frame mounted on said cradle for vertical movement relative thereto and having a cantilever extension at its upper end projecting transversely of the cradle, a hood hingedly connected to the outer end of said extension and adapted to overlie a car on said cradle, means for effecting a controlled retarded swinging movement of said hood during a portion of the dumping movement of the cradle, and means for effecting an upward movement of the frame relative to the cradle as the latter approaches car receiving position.

20. In a car dumper, a car receiving cradle adapted to be turned to car dumping position, a plurality of separate frames spaced longitudinally of and mounted on said cradle for vertical movement relative thereto, hoods hingedly connected to said frames and adapted to overlie a car on said cradle, and means for effecting controlled retarded swinging movement of said hoods during a portion of the dumping movement of the cradle.

21. In a car dumper, a car receiving cradle adapted to be turned to dump a car thereon, a hinged hood operatively connected with said cradle extending transversely toward the dumping side thereof and adapted to overlie the material in the car, and means for effecting a controlled positively retarded swinging movement of the hood during a portion of the dumping movement of the cradle, said means including a counterweight.

22. In a car dumper, a car receiving cradle adapted to be turned to dump a car thereon, a hinged hood operatively connected with said cradle extending transversely toward the dumping side thereof and adapted to overlie the material in the car, and means for effecting a controlled positively retarded swinging movement of the hood during the turning movement of the cradle in one direction and a relatively free swinging movement of the hood during the turning of the cradle in the opposite direction.

23. In a car dumper, a car receiving cradle adapted to be turned to dump a car thereon, a retarder movably connected with said cradle extending transversely toward the dumping side thereof and adapted to restrain the material from flowing out of the car during a portion of the dumping movement of the cradle, and means controlled by the dumping movement of the cradle for effecting automatically a positively controlled gradual movement of the retarder during another portion of the dumping movement of the cradle whereby the material may flow from the car.

24. In a car dumper, a car receiving cradle adapted to be turned to dump a car thereon, a retarder movably connected with said cradle and adapted to restrain the material from flowing out of the car during a portion of the dumping movement of the cradle, and means operatively connected with the retarder and including a counterweight for effecting automatically a positively controlled gradual movement of the retarder during another portion of the dumping movement of the cradle whereby the material may flow from the car.

25. In a car dumper, a car receiving cradle adapted to be turned to dump a car thereon, a retarder movably connected with said cradle and adapted to restrain the material from flowing out of the car during a portion of the dumping movement of the cradle, and means operatively connected with the retarder and including a fluid cylinder and piston for effecting a controlled gradual movement of the retarder during another portion of the dumping movement of the cradle, whereby the material may flow from the car.

26. In a car dumper, a car receiving cradle adapted to be turned to dump a car thereon, a retarder movably connected with said cradle and adapted to positively restrain the material from flowing outwardly of the car during a portion of the dumping movement of the cradle, and means actuated by the dumping movement of the cradle for effecting automatically a gradual movement of the retarder during another portion of the dumping movement of the cradle whereby the material may flow from the car, said means being adjustable to vary the rate of movement of the retarder.

27. In a car dumper, a car receiving cradle adapted to be turned to dumping position, a hinged hood carried by said cradle for bodily movement relative thereto and extending transversely thereof toward the dumping side, means for effecting a controlled retarded swinging movement of the hood during a portion of the dumping movement of the cradle, means for effecting a relative upward bodily movement of said hood as the cradle approaches car receiving position, and car clamping means movably carried by said cradle independently of said hood.

28. In a car dumper, a car receiving cradle adapted to be turned to car dumping position, a frame mounted on said cradle for vertical movement therewith and relative thereto, a hood hingedly connected to said frame and adapted to overlie a car on said cradle, means for effecting a controlled retarded swinging movement of said hood during a portion of the dumping movement of the cradle, and car clamping means mounted on said cradle for movement therewith and relative thereto and independently of said frame.

29. In a car dumper, a car receiving cradle adapted to be turned to car dumping position, a frame mounted on said cradle for vertical movement therewith and relative thereto, a hood hingedly connected to said frame and adapted to overlie a car on said cradle, means for effecting a controlled retarded swinging movement of said hood during a portion of the dumping movement of the cradle, and car clamping means mounted on said cradle for movement therewith and relative thereto and independently of the movement of said frame, said car clamping means having a portion cooperating with a portion of said frame during the dumping movement of the cradle to restrain said frame against outward vertical movement relative to the cradle.

30. In a car dumper, a car receiving cradle adapted to be turned to car dumping position, a frame mounted on said cradle for vertical movement therewith and relative thereto, said frame being provided with means adapted to engage the top edge of a car at the side thereof opposite to the dumping side, a hood hingedly connected to said frame and adapted to overlie a car on said cradle, means for effecting a controlled retarded swinging movement of said hood during a portion of the dumping movement of the cradle, and car clamping means mounted on said cradle for movement therewith and relative thereto and independently of the movement of said frame, said clamping means having a portion cooperating with said frame during a portion of the dumping movement of the cradle to restrain the frame against outward movement relative to the cradle.

31. In a car dumper, a car receiving cradle adapted to be turned to car dumping position, a frame mounted on said cradle for vertical movement relative thereto, a hood hingedly connected to said frame and adapted to overlie a car on said cradle, means for maintaining said hood against swinging movement relative to the cradle during the initial portion of the dumping movement and for effecting a controlled retarded swinging movement thereof during the latter portion of the dumping movement, means for effecting an upward movement of the frame relative to the cradle as the latter approaches car receiving position, and car clamping means mounted on said cradle for movement relative thereto and independently of the movement of said frame.

32. In a car dumper, a car receiving cradle adapted to be turned to dump a car thereon, a plurality of independent hinged hoods operatively connected with and spaced longitudinally of said cradle and extending transversely toward the dumping side thereof and adapted to overlie the material in the car, means for maintaining said hoods against swinging movement relative to the cradle during the initial portion of the dumping movement and for effecting a controlled retarded swinging movement thereof during the latter portion of the dumping movement, and car clamping means connected to said cradle independently of said hoods and extending transversely of the cradle during the dumping operation and intermediate certain of said hoods.

33. In a car dumper, a car receiving cradle adapted to be turned to car dumping position, a plurality of frames mounted on said cradle for independent vertical movement therewith and relative thereto, hoods hingedly connected to said frames and adapted to overlie a car on said cradle, means for effecting a controlled retarded swinging movement of said hoods during a portion of the dumping movement of the cradle, and car clamping means mounted on said cradle for movement therewith and relative thereto and independently of the movement of said frames.

34. In a car dumper, a car receiving cradle adapted to be turned to car dumping position, a plurality of frames mounted on said cradle for vertical movement therewith and relative thereto, hoods hingedly connected to said frames and adapted to overlie a car on said cradle, means for effecting a controlled retarded swinging movement of said hoods during a portion of the dumping movement of the cradle and car clamping means mounted on said cradle for movement therewith and relative thereto and independently of the movements of said frames, said clamping means during the dumping operation extending transversely of the cradle intermediate certain of said hoods and having portions cooperating with said frames to restrain the latter against outward movement relative to the cradle.

35. In a car dumper, a car receiving cradle adapted to be turned to car dumping position, a plurality of frames mounted on and spaced longitudinally of said cradle for vertical movement therewith and relative thereto, said frames being provided with members adapted to engage the top edge of a car at the side thereof opposite to the dumping side, hoods hingedly connected to said frames and adapted to overlie a car on said cradle, means for effecting a controlled retarded swinging movement of said hoods during a portion of the dumping movement of the cradle and car clamping means mounted on said cradle for movement therewith and relative thereto and independently of said frames, said clamping means during the dumping movement of the cradle extending transversely thereof intermediate certain of said hoods and having portions cooperating with said frames to restrain the latter against outward movement relative to the cradle.

36. In a car dumper a cradle adapted to be tilted to dump a car thereon, car clamping means, a hinged hood adapted to retard the outflow of material from said car during the dumping operation, said clamping means and said hood being movable vertically relative to said cradle, means for automatically moving said clamping means and said hood vertically as said cradle approaches car receiving position, and means for effecting positively controlled swinging movement of said hood when the cradle is tilted to dump the contents of the car.

37. In a car dumper, a car receiving cradle adapted to be turned to dump a car thereon, a hinged retarder operatively connected with said cradle and extending longitudinally thereof and adapted to overlie the car, said retarder being so disposed and shaped that its free edge when the retarder is in its lower position will fit or lie in close proximity to the dumping edge of the car, and means for effecting a regulated retarded swinging opening movement of the hinged retarder during the dumping operation so as to meter the outflow of the material from the car.

ARTHUR F. CASE.